United States Patent [19]

Takiguchi et al.

[11] Patent Number: 5,132,147
[45] Date of Patent: Jul. 21, 1992

[54] METHOD FOR ORIENTING A LIQUID CRYSTALLINE POLYMER

[75] Inventors: Yasuyuki Takiguchi, Ota; Shigeki Iida, Kawasaki; Takehiro Toyooka, Yokohama, all of Japan

[73] Assignee: Nippon Oil Company, Limited, Tokyo, Japan

[21] Appl. No.: 533,919

[22] Filed: Jun. 6, 1990

[30] Foreign Application Priority Data

Jun. 6, 1989 [JP] Japan .................. 1-143596

[51] Int. Cl.$^5$ .............................. B05D 3/02
[52] U.S. Cl. ..................... 427/393.5; 428/1; 252/299.01; 264/DIG. 73; 427/374.1; 427/322; 427/171
[58] Field of Search ............ 427/163, 322, 374.1, 427/393.5, 171; 428/1; 252/299.01; 264/2.7, DIG. 73

[56] References Cited

U.S. PATENT DOCUMENTS

| | | | |
|---|---|---|---|
| 2,544,659 | 3/1951 | Dreyer | 427/163 |
| 4,402,999 | 9/1983 | Tatsumichi et al. | 427/322 |
| 4,614,784 | 9/1986 | Kozakiewicz | 527/313 |
| 4,643,529 | 2/1987 | Hosonuma et al. | 350/337 |
| 4,810,338 | 3/1989 | DeMartino et al. | 204/157.88 |
| 4,818,624 | 4/1989 | Downey, Jr. | 427/163 |
| 4,824,699 | 4/1989 | Woo et al. | 427/322 |
| 4,863,767 | 9/1989 | Garg et al. | 428/1 |
| 4,886,718 | 12/1989 | Eich et al. | 428/1 |
| 4,933,243 | 6/1990 | Hara et al. | 430/20 |
| 4,963,402 | 10/1990 | Wong | 252/299.01 |
| 4,963,428 | 10/1990 | Harvey et al. | 264/85 |
| 5,011,623 | 4/1991 | Yoshinaga et al. | 252/299.5 |
| 5,024,784 | 6/1991 | Eich et al. | 252/299.01 |

FOREIGN PATENT DOCUMENTS 42618 5/1987 Japan .

Primary Examiner—Michael Lusignan
Assistant Examiner—Diana L. Dudash
Attorney, Agent, or Firm—Scully, Scott, Murphy & Presser

[57] ABSTRACT

A highly orientated, liquid crystalline polymer having a light controlling function and suitable for use in the optoelectronic field is prepared by applying a solution of a polymer which exhibits a thermotropic liquid crystallinity onto a stretched polymer film, drying the applied solution, and thereafter heat-treating the thus-coated film at a temperature at which said liquid crystalline polymer exhibits a liquid crystal phase, for a time sufficient for the molecules of the liquid crystalline polymer to be orientated.

7 Claims, No Drawings

METHOD FOR ORIENTING A LIQUID CRYSTALLINE POLYMER

BACKGROUND OF THE INVENTION

The present invention relates to a method for orientating a liquid crystalline polymer and more particularly to a method for preparing highly orientated, liquid crystalline polymer having a light controlling function and suitable for use in the optoelectronic field.

Generally, for using a liquid crystal as a device it is necessary to orientate the molecules of the liquid crystal in a certain arrangement, but this molecular orientation is changed by external force such as electric and magnetic fields, shear force, and interface. And a light controlling function derived from such change of the orientation is utilized for the application to various optoelectronics.

Liquid crystals are broadly classified into high-molecular liquid crystals and low-molecular ones. The former (high-molecular liquid crystals) are greatly characteristic in that they are used in a fixed state of their functions by fixing the orientated state of their molecules. Thus, the former liquid crystals are applied to fields different from the fields in which the latter-low-molecular liquid crystals are used. For example, such high-molecular liquid crystals are applied to an orientated film for low-molecular liquid crystals (described in Japanese Patent Laid Open No. 42618/1986), a non-linear optical element (described in Japanese Patent Laid Open No. 201419/1987), a circular polarization filter and a notch filter (both described in Japanese Patent Laid Open No. 191203/1985), and an optical memory (described in Japanese Patent Laid Open No. 66990/1987). In order to realize these applications it is necessary to highly control to a desired molecular orientation.

A method for controlling the state of orientation of a low-molecular liquid crystal using an orientated film has already been established and now serves as a basic technique for a twisted nematic or super twisted nematic type liquid crystal display. As to the method for controlling the state of orientation of high-molecular liquid crystals, there has been known a method (e.g. a method of providing an external force such as shear stress or a method of providing such an external force as electric or magnetic field) in which, in a certain limited region, the molecules of a high-molecular liquid crystal are orientated with an order Parameter higher than that in low-molecular liquid crystals irrespective of whether the liquid crystal is a nematic smectic or cholesteric type. But these methods involve inconveniences; for example, it is impossible to control the orientation over a wide area, or an intra-plane uniaxial orientation cannot be controlled even though a horizontal orientation can be effected. Thus, it is now impossible to say that there is an established technique for highly controlling the orientation of a high-molecular liquid crystal and fixing it.

SUMMARY OF THE INVENTION

It is the object of the present invention to provide a method for preparing a thin, liquid crystalline polymer film in which the molecules of the polymer are orientated in a certain direction in a plane parallel to a substrate without division of domain.

The method of the present invention for orientating a liquid crystalline polymer is characterized in that a coating of a polymer which exhibits thermotropic liquid crystallinity is brought into close contact with the surface of a stretched polymer film, followed by heat treatment at a temperature at which the said liquid crystalline exhibits a liquid crystal phase.

Having made various studies about means capable of highly controlling the orientation of a high-molecular liquid crystal, the present inventors confirmed that the molecules of a certain liquid crystalline polymer are orientated in the stretched direction of a stretched plastic film under certain conditions without the necessity of using an other special orientated layer. The method of the present invention is based on such finding. But the details as to why an orientated film of a liquid crystalline polymer is obtained by such means have not been made clear yet.

The method of the present invention will now be described in more detail. A liquid crystalline polymer film is formed on a stretched plastic film by a suitable method, e.g. coating, then this composite film is held in a temperature range in which the liquid crystalline polymer exhibits a liquid crystal phase to complete orientation. Typical examples of the stretched plastic film used in the invention are films of polyethylene terephthalate, polyacrylate, polyethylene naphthalate, polybutylene terephthalate, polyether ether ketone, polyethylene, polypropylene, polycarbonate, polystyrene, polyvinylidene chloride, polyimide, polyamide-imide, polyether imide, acetyl cellulose, and polyvinyl alcohol. The stretch ratio of these stretched polymer films cannot be specified unconditionally because it depends on the material of the plastic used, but generally it is in the range of 1.5 to 5×, preferably 2 to 4×. Either uniaxial or biaxial stretching is preferred, with the former being more preferable. The thickness of these stretched plastic films is not specially limited, but from the standpoint of productivity it is not smaller than 5 μm, preferably in the range of 20 to 300 μm. It is necessary for these stretched plastic films to have a sufficient mechanical strength at an orientating temperature of the molecules of a liquid crystalline polymer. If necessary, these stretched plastic films may be used in a laminated form together with other films.

On the other hand, the said liquid crystalline polymer is not specially limited if only it exhibits a thermotropic property. For forming a coating thereof on the stretched plastic film there may be adopted a method in which the liquid crystalline polymer is applied directly onto the plastic film at a temperature not lower than the glass transition point thereof at which the polymer exhibits fluidity, for a method in which the liquid crystalline polymer is applied as a solution thereof in a solvent. The latter method is particularly advantageous in point of uniformity of the film thickness.

The solvent used in preparing such liquid crystalline polymer solution differs depending on the kind of the liquid crystalline polymer used and the degree of polymerization thereof, but a suitable solvent is selected from halogenated hydrocarbons such as chloroform, dichloroethane, tetrachloroethane, trichloroethylene, tetrachloroethylene, and orthodichlorobenzene; mixed solvents of these halogenated hydrocarbons with phenolic solvents such as phenol, o-chlorophenol and cresol; non-protonic polar solvents such as dimethyl formamide, dimethyl acetamide and dimethyl sulfoxide; and etheric solvents such as tetrahydrofuran and dioxane. It is necessary to select a solvent which dissolves the liquid crystalline polymer but does not dissolve the stretched plastic film.

The concentration of the liquid crystalline polymer solution differs depending on the application method and the viscosity of the liquid crystalline polymer used, but usually it is in the range of 5 to 50%, preferably 10 to 30%, by weight. As the application method there may be adopted any of spin coating, roll coating, gravure coating, and dipping. After the application, the solvent is removed by drying, followed by heat treatment at a predetermined temperature for a predetermined time to complete a liquid crystal orientation of monodomain.

In practicing the method of the present invention, it is desirable to adopt a method in which only one side of the liquid crystalline polymer coating is brought into contact with the stretched polymer film for orientation. If both sides thereof are contacted with both sides of the stretched polymer film, or if contacted with both a substrate which has been subjected to another orientation treatment and the stretched polymer film, it is difficult for the molecules to be orientated to a satisfactory extend because of high viscosity peculiar to the high-molecular liquid crystal.

The temperature for orientation of the liquid crystalline polymer is not lower than the glass transition point of the polymer. For promoting the orientation based on an interfacial effect of the orientated film, the lower the viscosity of the polymer, the better, and hence the higher the temperature, the better. But a too high temperature is not desirable because it would result in increase of cost and deterioration of the working efficiency. Some liquid crystalline polymer has an isotropic phase in a higher temperature region than a liquid crystal phase, but if heat treatment is performed in this temperature region, uniform orientation is not obtained in many cases. Therefore, although it is necessary that the heat treatment temperature be not lower than the glass transition point of the liquid crystalline polymer, it is preferably below the transition point to the isotropic phase. Generally, a preferable range of the heat treatment temperature is from 50° to 300° C. As to the relation of the liquid crystalline polymer phase, it is preferable that the liquid crystalline polymer be in a nematic or cholesteric phase at this treatment temperature. If the polymer is in a smectic phase, it is difficult to obtain uniform orientation because of high viscosity.

The time required for obtaining sufficient orientation in the state of liquid crystal on the high-molecular plastic film differs depending on the composition and molecular weight of the polymer, so cannot be specified unconditionally, but a preferred range is from 10 seconds to 2 hours. A shorter time than 10 seconds will result in insufficient orientation.

The liquid crystalline polymer used in the method of the present invention exhibits a thermotropic property. Examples are main chain type liquid crystalline polymers having liquid crystalline residues in the main chains thereof such as polyesters, polyester amides, polycarbonates, and polyethers of the following structural formual:

$$\{M^1-X^1\}\{A^1-X^2\}$$

$X^1, X^2$: —COO—, —CONH—, —OCO,

—O— or the like,

-continued

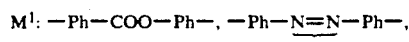
$M^1$: —Ph—COO—Ph—, —Ph—N=N—Ph—,

—Ph—Ph—, —Ph—Ph—COO—Ph,

—Ph—N=CH—Ph— or the like,

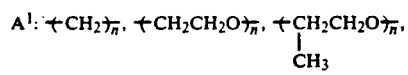
$A^1$: —(CH$_2$)$_n$—, —(CH$_2$CH$_2$O)$_n$—, —(CH$_2$CH$_2$O)$_n$—,
   |
   CH$_3$

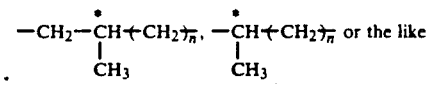
—CH$_2$—*CH—(CH$_2$)$_n$—, —*CH—(CH$_2$)$_n$— or the like
       |                    |
       CH$_3$                CH$_3$ wherein Ph represents a phenylene group,

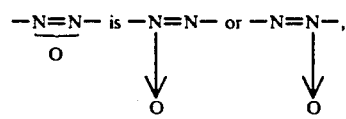
—N=N— is —N=N— or —N=N—,
   |              |        |
   O              ↓        ↓
                  O        O the * mark represents an asymmetric carbon atom, and the * mark represents an asymmetric carbon atom, and n is an integer of 0 to 18;

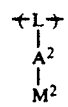
$\{L\}$
  |
  $A^2$
  |
  $M^2$

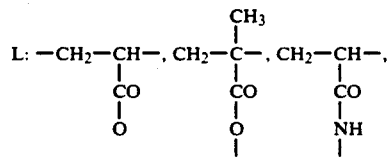
         CH$_3$
          |
L: —CH$_2$—CH—, CH$_2$—C—, CH$_2$—CH—,
        |        |         |
        CO       CO        CO
        |        |         |
        O        O         NH

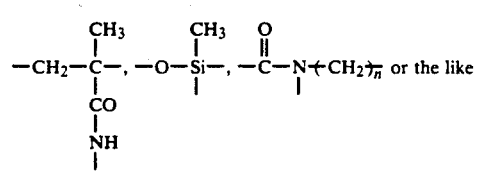
      CH$_3$     CH$_3$    O
       |         |       ‖
—CH$_2$—C—, —O—Si—, —C—N—(CH$_2$)$_n$ or the like
       |         |       |
       CO
       |
       NH CH$_3$
                            |
$A^2$: —(CH$_2$)$_n$—, —(CH$_2$CH$_2$O)$_n$—, —(CHCH$_2$O)$_n$— or the like, $M^2$: —Ph—Ph—R, —O—Ph—Ph—R, —Ph—COO—Ph—R, —O—Ph—COO—Ph—R, —Ph—COO—Ph—R, —O—Ph—OCO—Ph—R, —Ph—Ph—COO—Ph—R, —O—Ph—Ph—COO—Ph—R, —Ph—OCO—Ph—Ph—R, —O—Ph—COO—Ph—Ph—R, —Ph—Ph—OCO—Ph—R, —O—Ph—OCO—Ph—Ph—R, —Ph—OCO—Ph—Ph—R, -continued
—O—Ph—OCO—Ph—Ph—R or the like.

wherein R is alkyl alkoxy, halogen, nitro, or cyano, and n is an integer of 0 to 18;

The state of orientation of the liquid crysrtalline polymer film thus orientated in the state of liquid crystal can be solidified by cooling the film to a temperature below the glass transition point of the polymer. The cooling rate is not specially limited. It is sufficient to merely make a shift from the heated atmosphere to an atmosphere below the glass transition point.

Working examples for the present invention will be described below, but it goes without saying that the present invention is not limited thereto.

EXAMPLE 1

A 20 wt % solution of a liquid crystalline polymer (racemate) represented by the following formula an having a nematic phase in tetrachloroethane was applied by a spin coating method onto a uniaxially stretched polyester film (trade name: Lumirror U20, a product of Toray Industries, Inc.) having a thickness of about 100 um:

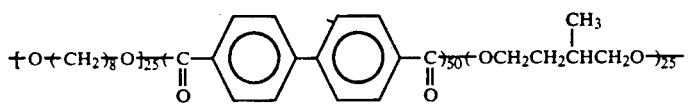

Glass transition temperature: 44° C.

Nematic ⇌ Isotropic phase liquid transition temperature: 150° C.

The thickness of the liquid crystalline polymer film is preferably not larger than 100 μm, more preferably not larger than 50 μm. If the film thickness is larger than 100 μm, it will become difficult to obtain uniform orientation.

When a substrate with the thin, liquid crystalline polymer film according to the present invention is used at a temperature near room temperature and after fixing of the orientation which is the greatest feature of the liquid crystalline polymer, that is, after fixing the orientated state in liquid crystal by cooling to a temperature below the glass transition point of the polymer, it is preferable that the glass transition point of the liquid crystalline polymer be not lower than 30° C., more preferably not lower than 50° C. If the glass transition point of the polymer is lower than 30° C., the the use of the substrate with the film at room temperature or thereabouts may cause a change of the solidified liquid crystal structure, so such low glass transition point is not desirable.

According to the method of the present invention, for some particular use, it is possible to let the liquid crystalline polymer exhibit a cholesteric phase by introducing an optically active group into the liquid crystalline polymer or by the addition of an optically active group-containing liquid crystalline polymer, low-molecular liquid crystal or non-liquid crystalline substance. Examples of such use include a circular polarization filter, a notch filter and an optical memory which utilizes selective reflection of the cholesteric phase. In this case, the molecules of the liquid crystalline polymer in contact with the substrate (high-molecular plastic film) are orientated in parallel with the stretched direction of the high-molecular plastic film, while in the film thickness direction there is obtained a twist structure corresponding to the pitch of the liquid crystalline polymer molecules.

The orientated, liquid crystalline polymer thus obtained may be used as it is, or may be used after forming thereon a protective layer of a transparent plastic material for the purpose of protection. Further, it may be used in a combined form with other optical elements, e.g. polarizer.

The thus-coated film was dried at 70° C. to form a coating of about 4 μm thick. This sample was heat-treated at 130° C. for 30 minutes. The sample thus heat-treated was transparent and uniform throughout the whole surface thereof (10 cm × 10 cm), with no orientation defect, e.g. disclination, observed. Further, using a hot stage FP82 (a product of Mettler Co.), a very small test piece (2 cm × 2 cm) produced in the same manner as above was observed through a polarizing microscope under a crossed nicol while it was held at 130° C. As a result, a dark field was obtained upon coincidence of the substrate stretching axis with the polarizing plate transmission or absorption axis, and it was confirmed that the molecules of the liquid crystalline polymer were orientated in parallel with the substrate stretching axis.

When the sample thus obtained was cooled to room temperature, it turned out by the same polarizing microscope observation as above that an almost equal orientation to the liquid crystal phase was solidified.

EXAMPLE 2

A liquid crystalline polymer coating was formed in the same way as in Example 1 except that a stretched polyether ether ketone film having a thickness of about 25 um (TALPA 2000, a product of Mitsui Toatsu Chemicals, Inc.) was used as the substrate. The liquid crystalline polymer coating thus obtained exhibited superior orientatability as in Example 1.

EXAMPLE 3

An orientated liquid crystalline polymer was prepared in the same way as in Example 1 except that as the liquid crystalline polymer solution there was used a 20 wt % solution of the liquid crystalline polymer used in Example 1 in tetrachloroethane with 5 wt % of an optically active, liquid crystalline polymer of the same structure incorporated therein.

This orientated liquid crystalline polymer was transparent, uniform and free of defect in the state of liquid crystal. As a result of polarization analysis it turned out that on the substrate the molecules of the polymer were orientated in parallel with the stretched direction of the substrate, taking a cholesteric planar structure having a twist of about 150° C. in the thickness direction. It was also confirmed that the above structure was substantially retained even when the liquid crystalline polymer obtained was cooled to room temperature.

EXAMPLE 4

A liquid crystalline polymer represented by the following formula and having a nematic phase was dissolved in 1,1,2,2-tetrachloroethane to prepare a 15 wt % solution thereof:

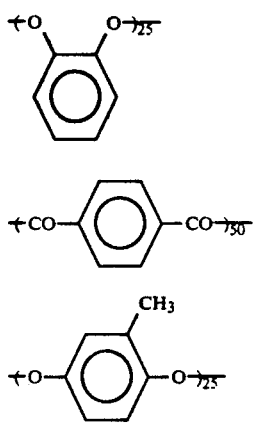

Then, in the same manner as in Example 2 the above solution was applied onto a polyether ether ketone film as a substrate by a spin coating method, followed by drying at 70° C.

Subsequently, this sample was heat-treated at 190° C. for 5 minutes in an air constant temperature bath. As a result, the sample was transparent, uniform and free of orientation defect, e.g. disclination.

The sample was cooled to room temperature to fix the orientation; as a result, there was obtained a completely transparent and smooth film having a thickness of about 1.1 μm. As a result of observation of this film under a crossed nicol of a polarizing microscope, a dark field was observed upon coincidence of the substrate stretching direction with a transmission axis of a polarizing plate, with no defects observed.

According to the present invention, a horizontal and directionality-controlled coating of a liquid crystalline polymer is obtained by merely heating and cooling a laminate of a stretched polymer film and a coating of a liquid crystalline polymer solution. Thus, the manufacturing means is simple and the productivity is high. And the resulting orientated, liquid crystalline polymer film is uniform, transparent, has a mondomain orientation and possesses extremely superior optical properties. It is also possible for the orientated liquid crystalline polymer to have a twist structure by using a cholesteric liquid crystalline polymer. When these characteristics are utilized, the orientated liquid crystalline polymer prepared according to the present invention is of extremely high industrial value in the fields of optical filters, memory media and non-linear optical elements.

What is claimed is:

1. A method for orienting a liquid crystalline polymer comprising applying a solution of a polymer which exhibits a thermotropic liquid crystallinity, said polymer being present in said solution in a concentration in the range of between 5% and 50% by weight, onto a stretched polymer film, drying the applied solution, heat-treating the thus-coated film at a temperature at which said liquid crystalline polymer exhibits a liquid crystal phase, for a time sufficient for the molecules of the liquid crystalline polymer to be oriented, and thereafter cooling the coated film to a temperature below the glass transition point of said liquid crystalline polymer.

2. A method as set forth in claim 1, wherein the heat treatment temperature and time are in the ranges of 50° to 300° C. and 10 seconds to 2 hours, respectively.

3. A method as set forth in claim 1, wherein the stretch ratio of said stretched polymer film is in the range of 1.5 to 5.

4. A method as set forth in claim 1, wherein said liquid crystalline polymer is a main chain type liquid crystalline polymer having liquid crystalline residues in the main chain thereof.

5. A method as set forth in claim 1, wherein said stretched polymer film is a film of a polymer selected from the group consisting of polyethylene terephthalate, polyacrylate, polyethylene naphthalate, polybutylene terephthalate, polyethylene ether ketone, polyethylene, polypropylene, polycarbonate, polystyrene, polyvinylidene chloride, polyimide, polyamide-imide, polyether imide, acetyl cellulose and polyvinyl alcohol.

6. A method as set forth in claim 4, wherein the liquid crystalline polymer has a glass transition point of not less than 30° C.

7. A method as set forth in claim 6, wherein said liquid crystalline polymer is selected from the group consisting of polyesters, polyester amides, polycarbonates and polyethers, said polyethers having a structural formula selected from the group consisting of:

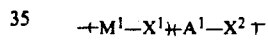

wherein $X^1$ and $X^2$ are the same or different and are —COO—, —CONH—, —OCO or —O—;

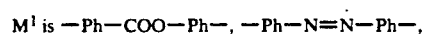

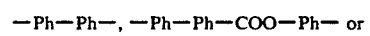

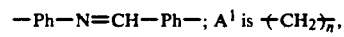

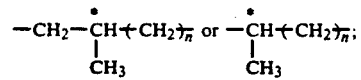

Ph is a phenylene group;

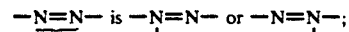

the * mark represents an asymmetric carbon atom; and n is an integer of 0 to 18; and where L is
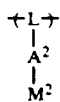
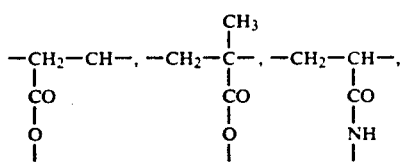
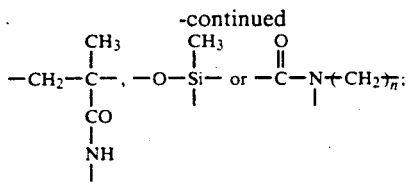
$A^2$ is $+CH_2+_n$, $+CH_2CH_2O+_n$ or 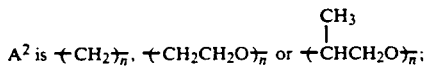;
$M^2$ is —Ph—Ph—R, —O—Ph—Ph—R, —Ph—COO—Ph—R, —O—Ph—COO—Ph—R, —Ph—COO—Ph—R, —O—Ph—OCO—Ph—R, —Ph—Ph—COO—Ph—R, —O—Ph—Ph—COO—Ph—R, —Ph—OCO—Ph—Ph—R, —O—Ph—COO—Ph—Ph—R, —Ph—Ph—OCO—Ph—R, —O—Ph—OCO—Ph—Ph—R, —Ph—OCO—Ph—Ph—R, or —O—Ph—OCO—Ph—Ph—R; R is alkyl, alkoxy, halogen, nitro or cyano; and n is an integer of 0 to 18;
* * * * *